US011795864B2

(12) United States Patent
Sadiku et al.

(10) Patent No.: US 11,795,864 B2
(45) Date of Patent: Oct. 24, 2023

(54) COOLANT VALVE FOR A MOTOR VEHICLE

(71) Applicant: PIERBURG GMBH, Neuss (DE)

(72) Inventors: Besart Sadiku, Cologne (DE); Dominik Nieborg, Neuss (DE)

(73) Assignee: PIERBURG GMBH, Neuss (DE)

( * ) Notice: Subject to any disclaimer, the term of this patent is extended or adjusted under 35 U.S.C. 154(b) by 35 days.

(21) Appl. No.: 17/620,753

(22) PCT Filed: Jun. 26, 2019

(86) PCT No.: PCT/EP2019/067033
§ 371 (c)(1),
(2) Date: Dec. 20, 2021

(87) PCT Pub. No.: WO2020/259825
PCT Pub. Date: Dec. 30, 2020

(65) Prior Publication Data
US 2022/0412248 A1    Dec. 29, 2022

(51) Int. Cl.
*F16K 31/06*    (2006.01)
*F01P 7/14*    (2006.01)

(52) U.S. Cl.
CPC ............ *F01P 7/14* (2013.01); *F16K 31/0655* (2013.01); *F16K 31/0693* (2013.01); *F01P 2007/146* (2013.01)

(58) Field of Classification Search
CPC ... F01P 7/14; F01P 2007/146; F16K 31/0655; F16K 31/0693; F16K 31/0686; F16K 31/0658
See application file for complete search history.

(56) References Cited

U.S. PATENT DOCUMENTS

| | | | |
|---|---|---|---|
| 2007/0051105 A1* | 3/2007 | Thiery | F02M 26/26 60/600 |
| 2009/0301081 A1 | 12/2009 | Thiery et al. | |
| 2010/0206388 A1 | 8/2010 | Bielab | |
| 2010/0282223 A1 | 11/2010 | Czimmek et al. | |
| 2013/0313455 A1 | 11/2013 | Bittner | |

(Continued)

FOREIGN PATENT DOCUMENTS

DE    1 200 324 B    9/1965
DE    10 2012 010140 A1    11/2013

(Continued)

*Primary Examiner* — Jacob M Amick
(74) *Attorney, Agent, or Firm* — Norman B. Thot

(57) ABSTRACT

A coolant valve for a motor vehicle. The coolant valve includes a housing with an inlet and an outlet, a valve seat which surrounds a flow cross-section formed between the inlet and the outlet, and a control body which is placeable on and liftable off the valve seat via an actuator. The control body has through-going bores via which the inlet is continuously connected to a chamber on a side of the control body which faces away from the inlet, a first annular protrusion which axially extends towards the valve seat and via which the control body is placed on the valve seat, a wall which extends radially between the first annular protrusion and the through-going bores, and an axial groove which extends in a circumferential direction and which is delimited radially to an outside by the first annular protrusion and radially to an inside by the wall.

11 Claims, 2 Drawing Sheets

(56) References Cited

U.S. PATENT DOCUMENTS

| | | | |
|---|---|---|---|
| 2018/0003313 A1* | 1/2018 | Schnelker | ............... F02B 37/16 |
| 2020/0096129 A1 | 3/2020 | Bonanno | |

FOREIGN PATENT DOCUMENTS

| | | |
|---|---|---|
| DE | 10 2015 101 477 A1 | 8/2016 |
| DE | 10 2016 112 409 A1 | 1/2018 |
| JP | 2007-71207 A | 3/2007 |
| JP | 6025006 B1 | 11/2016 |
| JP | 2018-504564 A | 2/2018 |
| JP | 2018/179025 A | 11/2018 |
| KR | 10-1944990 B1 | 2/2009 |
| KR | 2 405 167 A2 | 1/2012 |
| WO | WO 2009/108533 A2 | 9/2009 |
| WO | WO 2017/141606 A1 | 8/2017 |
| WO | WO 2018/114644 A1 | 6/2018 |
| WO | 2019-65815 A | 4/2019 |
| WO | WO 2020/187673 A1 | 9/2020 |

* cited by examiner

COOLANT VALVE FOR A MOTOR VEHICLE

CROSS REFERENCE TO PRIOR APPLICATIONS

This application is a U.S. National Phase application under 35 U.S.C. § 371 of International Application No. PCT/EP2019/067033, filed on Jun. 26, 2019. The International Application was published in German on Dec. 30, 2020 as WO 2020/259825 A1 under PCT Article 21(2).

FIELD

The present invention relates to a coolant valve for a motor vehicle, the coolant valve including a housing comprising an axial inlet and a radial outlet, a flow cross-section formed between the inlet and the outlet and surrounded by a valve seat, a control body which is adapted to be placed on the valve seat and lifted off the valve seat via an actuator, and through-going bores in the control body via which the inlet is continuously connected to a chamber on the side of the control body facing away from the inlet.

Pressure-balanced valves have in particular previously been described for applications in the gas-conveying area where the pressure balance particularly allows for the switching times to be considerably reduced. These are, for example, divert-air valves for turbochargers in motor vehicles. Such a divert-air valve is described, for example, in DE 10 2012 010 140 A1. In the closed state of the valve, the through-going bores in the control body here serve for a pressure balance between the side of the control body facing the valve seat and the side of the control body facing away from the valve seat. An undesired opening of the valve in the case of an increased total pressure in the inlet branch of the valve device is thereby prevented and an insensitivity to pulsations is achieved.

Coolant shutoff valves having such a pressure balance have not yet been described. This is, for example, attributable to the fact that in the case of such valves, a medium flow, such as a coolant flow, including impurities, such as, for example, particles, can enter the chamber behind the bores through the bores in the control body, in which chamber the impurities can be deposited. Both the bores can get clogged and the pressure-balancing function of the control body can fail if such a process progresses, resulting in a sluggishness of the valve when particles have deposited in the sliding area between the guiding sleeve, and the movable valve parts or the chamber is excessively filled with particles.

DE 10 2016 112 409 A1 thus describes a coolant valve through which a coolant axially flows, where an axial groove is formed at the outlet branch caused by the particle load of the coolant flow, which axial groove is configured so that it is open towards the housing for defining a dirt pocket where dirt from the coolant can be collected. Such an axial groove arranged as described above cannot, however, prevent a malfunction of the pressure-balancing bores.

The conventional configurations are disadvantageous in that depositing of impurities in the through-going bores or in the chamber behind the control body cannot reliably be decreased. The pressure-balancing function and the correct functional capability of the control body are thereby at risk.

SUMMARY

An aspect of the present invention is to provide a robust and inexpensive coolant valve whose functional capability, in particular the pressure-balancing function and the movability of the control body, is reliably maintained.

In an embodiment, the present invention provides a coolant valve for a motor vehicle. The coolant valve comprises a housing comprising an axial inlet and a radial outlet, a valve seat which surrounds a flow cross-section formed between the axial inlet and the radial outlet, and a control body which is configured to be placed on the valve seat and to be lifted off the valve seat via an actuator. The control body comprises through-going bores via which the axial inlet is continuously connected to a chamber on a side of the control body which faces away from the axial inlet, a first annular protrusion which axially extends towards the valve seat and via which the control body is configured to be placed on the valve seat, a wall which extends radially between the first annular protrusion and the through-going bores, and an axial groove which extends in a circumferential direction and which is delimited radially to an outside by the first annular protrusion and radially to an inside by the wall.

BRIEF DESCRIPTION OF THE DRAWINGS

The present invention is described in greater detail below on the basis of embodiments and of the drawings in which.

DETAILED DESCRIPTION

Figure 1:
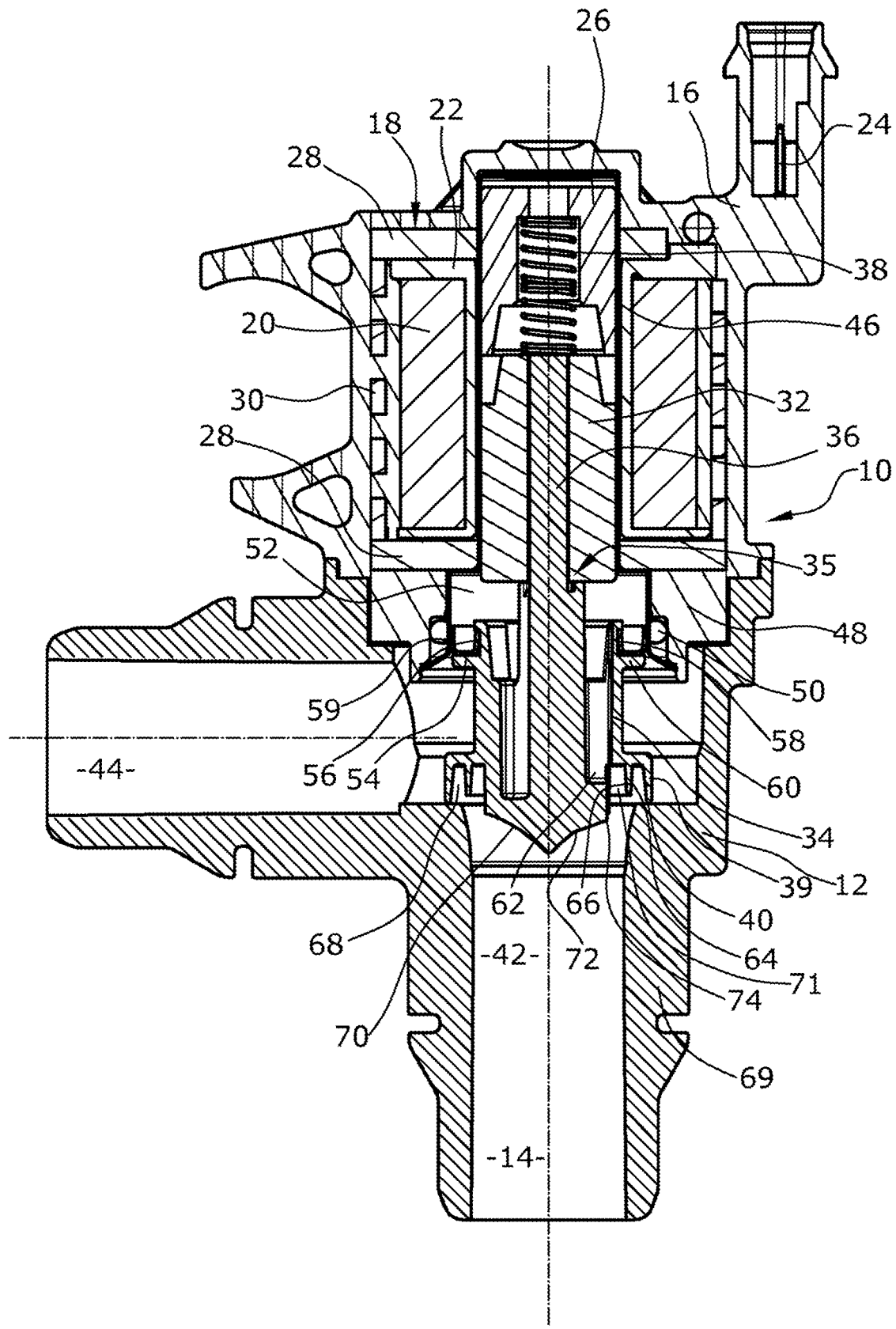
FIG. 1 shows a sectional side view of a coolant valve according to the present invention.
Figure 2:
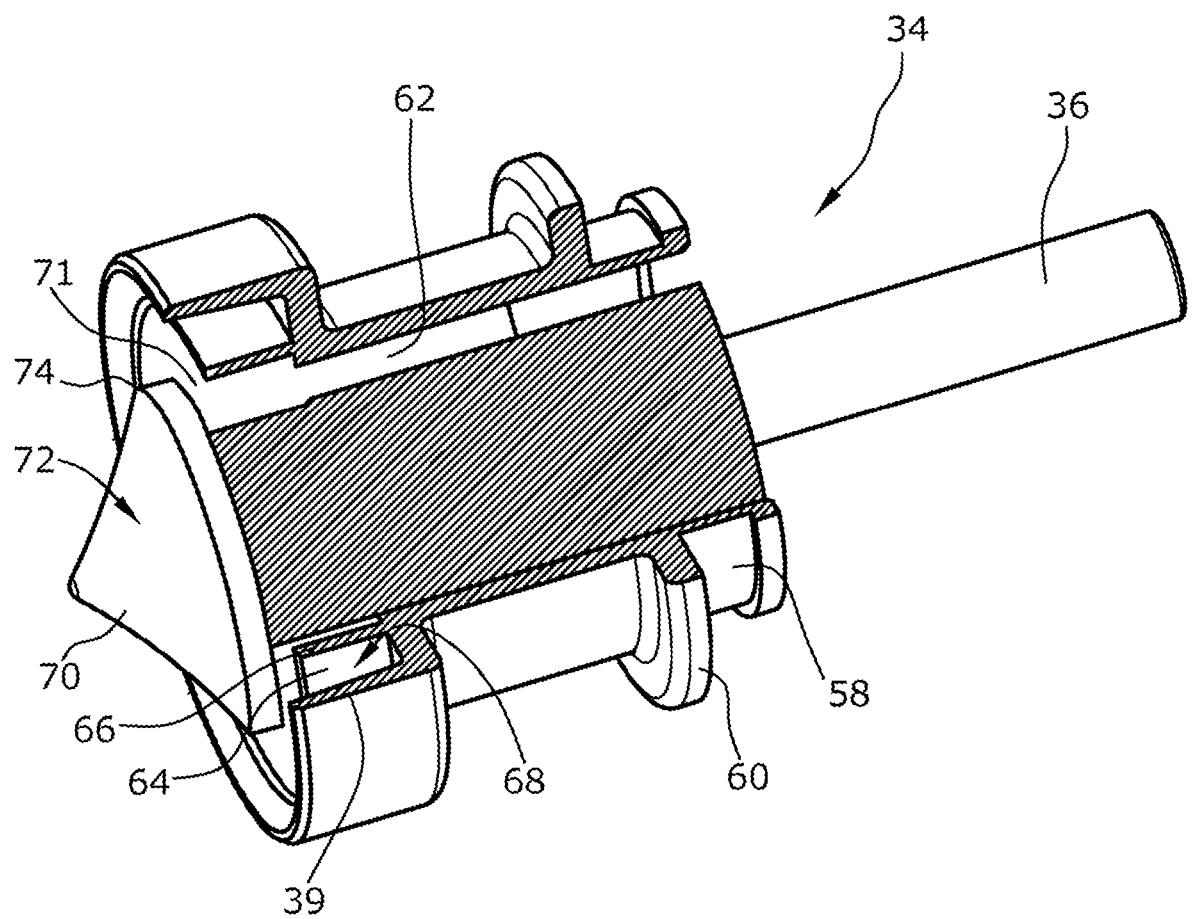
FIG. 2 shows a sectional perspective view of a control body of the coolant valve according to the present invention of FIG. 1.

Since the control body comprises a first annular protrusion axially extending towards the valve seat and via which the control body can be placed on the valve seat, and an axial groove extending in the circumferential direction is formed at the control body and delimited to the outside by the first annular protrusion and radially to the inside by a wall radially extending between the first annular protrusion and the through-going bores, an inflow of impurities in the coolant into the through-going bores and thus into the chamber on the side of the control body opposite to the inlet is considerably decreased. The axial groove here acts as a dirt trap which prevents the dirt particles from flowing from radially outside the through-going bores towards the through-going bores. This arrangement provides that considerably fewer particles reach the chamber behind the control body and thus the sliding area of the armature, so that the functionality of the valve can be provided over a longer period.

The wall can, for example, be constituted by a second annular protrusion which is configured radially inside the first annular protrusion, and the axial groove is annularly formed between the first annular protrusion and the second annular protrusion. The wall accordingly extends along the overall circumference so that an outflow of the particles from the axial groove in the axial direction is also precluded because these particles could otherwise be redirected again towards the through-going bores. This configuration provides that the main flow is always realized in the axial groove, which main flow is directed away from the through-going bores. The amount of particles reaching the chamber can accordingly be further decreased.

It is particularly advantageous when the second annular protrusion is arranged concentrically to the first annular protrusion since the pressure differences in the axial groove caused by the shape can thereby be avoided, which could otherwise result in undesired flows towards the through-going bores.

In an embodiment of the present invention, the wall delimiting the axial groove can, for example, extend axially. It is thereby provided that the main flow from the axial groove does not comprise any component traveling towards the through-going bore, and thus the particle flow to the rear side of the control body is decreased.

In an embodiment of the present invention, the inlet can, for example, be constituted by an axial inlet branch whose inner diameter is larger than or equal to an inner diameter of the second annular protrusion and which is arranged concentrically to the second annular protrusion. When the ventil is opened, a pressure drop between the first annular protrusion and the valve seat occurs, thereby producing a flow in the gap. The produced flow is not influenced by the arrangement of the second annular protrusion in the area located farther inwards since it is not disposed in the flow path; a pressure gradient is also not generated at the second annular protrusion. A flow in the radially inner area of the second annular protrusion and hence an inflow into the through-going bores is thus avoided to the greatest extent possible.

Such a build-up of a pressure drop at the second annular protrusion is further prevented in that, in the closed state of the coolant valve in which the control body rests on the valve seat via its first annular protrusion, the wall delimiting the axial groove radially to the inside has an axial distance to the valve seat, and/or in that the axial extension of the wall delimiting the axial groove radially to the inside is smaller than the axial extension of the first annular protrusion. It is accordingly avoided that the gap between the valve seat and the control body influences an outflow through the gap even when the second annular protrusion is disposed at a location radially relatively far towards the outside.

In an embodiment of the present invention, a protective particle screen can, for example, be configured at the control body on the side of the control body facing the inlet, wherein a projection area of the protective particle screen at least partially covers, in the axial direction relative to the control body, ends of the through-going bores in the control body facing the protective particle screen, and wherein the wall delimiting the axial groove radially to the inside has a larger diameter than the protective particle screen. This protective particle screen considerably decreases the amount of particles flowing into the chamber formed in the housing on the side of the control body opposite to the inlet since a straight inflow is prevented to the greatest extent possible by the through-flow openings. The required flow resistance for the particles intended to prevent them from reaching the rear side of the control body is accordingly considerably increased. The functional capability of the coolant valve is accordingly maintained for an even longer period.

In an embodiment of the present invention, the projection area of the protective particle screen can, for example, cover, in the axial direction relative to the ends of the through-going bores in the control body facing the protective particle screen, at least 90% of the ends of the through-going bores, wherein an inflow gap as a fluidic connection of the inlet to the through-going bores is radially formed between the protective particle screen and the wall delimiting the axial groove radially to the inside. Such covering nearly forcibly causes a redirection when a particle is to flow into the chamber from the inlet to the rear side of the control body. A considerable decrease of the particles reaching the chamber is accordingly achieved.

The protective particle screen can, for example, comprise a rotationally symmetrical approach flow area which continuously decreases in the axial expansion from the center radially to the outside. A redirection of the flow along the area from the middle radially towards the outside is accordingly created so that the flow is directed to the outlet. The pressure drop is thereby reduced and a direct approach flow to the through-going bores is decreased.

The approach flow area of the protective particle screen here concavely extends from the center radially towards the outside so that the axial approach flow is gradually converted into a radial outflow, and thus the axial inflow into the through-going bores is decreased. In particular heavy dirt particles accordingly do not reach the rear side of the control body.

In the open state of the coolant valve in which the control body is lifted off the valve seat, a tangent can, for example, extend at a radial outer edge of the approach flow area of the protective particle screen between the valve seat and the first annular protrusion, whereby the particles are directed into the gap between the valve seat and the control body and thus past the axial groove. A 90° redirection must be accordingly be performed for an inflow into the through-going bores.

It is also advantageous when the actuator is an electromagnetic actuator having an armature which, together with the control body, constitutes a movement unit which, in the closed state of the coolant valve, comprises the same area being pressure-effective in the axial direction on the side facing the inlet as on the side of the movement unit facing away from the inlet. There is accordingly not only a pressure balancing at the movement unit via the through-going bores but also a force balancing so that only the force of the actuator acts upon the movement unit. Such a valve is insensitive to pressure fluctuations and is adapted to be moved with the aid of exact actuation forces so that a relatively small actuator can be used.

A robust coolant valve is thus provided which is easy and inexpensive to manufacture and which is insensitive to dirt and particles in the coolant. The functional capability of the coolant valve is accordingly reliably maintained over a long period since an inflow of the particles into the through-going bores, and thus to the side of the control body facing away from the inlet, is avoided to the greatest extent possible. Only a few particles thus reach the sliding area between the armature and the sliding bushing. The pressure-balancing function, and thus the reliable switching capability of the coolant valve even in the case of pressure fluctuations, are thus maintained in that the through-going bores of the control body are prevented from clogging.

An exemplary embodiment of a coolant valve according to the present invention is illustrated in the drawings and will be described below.

The coolant valve illustrated in FIG. 1 is made up of a housing 10 which has a bipartite configuration and which comprises a flow housing 12 having a flow channel 14 defined therein, and an actuator housing 16 which is fastened to the flow housing 12 and in which an electromagnetic actuator 18 is arranged.

The electromagnetic actuator 18 comprises an electromagnetic circuit which is made up of a coil 20 wound onto a coil carrier 22 which can be supplied with current via a plug 24, as well as a magnetizable core 26, reflux elements 28, a yoke 30, and a movable armature 32. When current is supplied to the coil 20, the armature 32 is moved towards the core 26 in a known manner by the generated magnetic forces.

The armature 32, together with a control body 34, forms a movement unit 35 in that the armature 32 is connected to the control body 34 via a coupling member 36 which is integrally formed with the control body 34 and which extends into a bore of the armature 32 and is fastened to the armature 32 in the bore. The movement unit 35 is loaded by a spring 38 in a direction away from the core 26, whereby the control body 34 is pressed by a radially outer first annular protrusion 39 extending axially to a valve seat 40 which is formed in the flow housing 12 between an axial inlet 42 and a radial outlet 44 so that a flow cross-section of the flow channel 14 is closed. When current is supplied to the coil 20, the magnetic force exceeds the force of the spring 38, whereby the first annular protrusion 39 of the control body 34 is lifted off the valve seat 40 and thus clears the flow cross-section.

The armature 32 is guided in a sleeve 46 in which the core 26 is fastened and which extends radially inside the electromagnetic actuator 18 and into a housing protrusion 48 of the actuator housing 16, which housing protrusion 48 axially extends into the flow housing 12. An O-ring 50 is arranged between the housing protrusion 48 and an end area of the sleeve 46, via which O-ring 50 the radially outer area of the sleeve 46 is sealed towards the coolant so that no coolant can reach the coil 20.

The sleeve 46 also defines a chamber 52 which is provided on a side of the control body 34 and/or the movement unit 35 facing away from the axial inlet 42 and which is sealed towards the radial outlet 44 via a lip seal ring 54 whose closed side faces the radial outlet 44. The lip seal ring 54 is moved together with the control body 34 and is fastened in a radial groove 58 of the control body 34 via its inner leg 56 and abuts on the sleeve 46 via its outer leg 59. The closed side of the lip seal ring 54 axially abuts on a support surface 60 of the control body 34 which is configured as a circumferential radial protrusion at the control body 34.

The chamber 52 is continuously connected to the axial inlet 42 via through-going bores 62 formed in the control body 34, whereby the movement unit 35 is pressure-balanced. There is also a force balance with regard to hydraulic forces since the area on the side away from the axial inlet 42, upon which pressure acts, also corresponds to the area of the control body 34 radially inside the first annular protrusion 39. The control body 34 is accordingly movable exclusively dependent on the spring force and the electromagnetic force.

For maintaining this pressure balance and preventing contaminations between the sleeve 46 and the armature 32 or the control body 34, a wall 64 is provided at the control body 34, which wall 64, in the present exemplary embodiment, is configured as a radially extending second annular protrusion 66 which is concentrically configured inside the first annular protrusion 39 so that between the two radially extending annular protrusions 39, 66 an axial groove 68 is formed which extends in the circumferential direction and, in the present exemplary embodiment, is also of an annular configuration. The axial height of the second annular protrusion 66 is here slightly smaller than that of the first annular protrusion 39 so that the second annular protrusion 66 is prevented from being placed on the valve seat 40. In the present exemplary embodiment, the diameter of the second annular protrusion 66 essentially corresponds to the inner diameter of an inlet branch 69 constituting the axial inlet 42, but can also be made smaller.

The axial inlet 42 is not, however, completely axially connected to the chamber 52 via the through-going bores 62 since the ends of the through-going bores 62 are for the most part covered by a protective particle screen 70, as seen in the axial direction, which protective particle screen 70 is centrally provided at the end of the control body 34 facing the axial inlet 42. The inflow into the through-going bores 62 must accordingly be realized through an inflow gap 71 first between the protective particle screen 70 and the wall 64 and/or the second annular protrusion 66 whose diameter is slightly larger than that of the protective particle screen 70. From there, for realizing a flow through the through-going bores 62, the flow must be redirected radially inwards into the through-going bores 62, and from there, axially into the chamber 52. Since the protective particle screen 70 comprises a rotationally symmetrical approach flow area 72 which continuously concavely decreases in the axial expansion from the center radially to the outside so that, when the coolant valve is open, a main flow is realized via a radial outer edge 74 of the approach flow area 72 of the protective particle screen 70 between the valve seat 40 and the first annular protrusion 39, the main portion of the flow, and thus in particular the inert particles are for the most part guided past the through-going bores 62 to the radial outlet 44.

The particles not reaching the radial outlet 44 which arrive at the first annular protrusion 39 from radially inside are redirected in the axial groove 68 in the form of an eddy flow and reach the wall 64 which redirects them again away from the through-going bores 62 towards the axial inlet 42 and the radial outlet 44. Since the pressure gradient drives the coolant flow radially outwards to the radial outlet 44, and the wall 46 is arranged radially inside the extension of the inlet branch 69, nearly no flow of the heavier particles towards the chamber 52 is produced. Both a clogging of the through-going bores 62 and a deposition of the particles between the sleeve 46 and the movement unit 35 are thereby reliably prevented, so that a sluggishness of the valve is avoided The valve device according to the present invention is inexpensive to manufacture and robust in operation. It maintains the pressure-balancing function of the control body in that penetration of impurities into the control body is considerably decreased, whereby function-relevant parts are not further loaded by the impurities. The service life of the coolant valve is accordingly increased.

It should be appreciated that the scope of the present invention is not limited to the described exemplary embodiment. The coupling between the armature and the control body can, for example, be realized in a different manner, or the control body can be of a multi-part configuration. Instead of the continuous annular protrusion, screening by the wall can in particular be effected only opposite to the through-going bores so that several axial grooves are distributed on the circumference. Reference should be had to the appended claims.

LIST OF REFERENCE NUMERALS

10 Housing
12 Flow housing
14 Flow channel
16 Actuator housing
18 Electromagnetic actuator
20 Coil
22 Coil carrier
24 Plug
26 Core
28 Reflux elements
30 Yoke
32 Armature 34 Control body
35 Movable unit
36 Coupling member
38 Spring
39 First annular protrusion
40 Valve seat
42 Axial inlet
44 Radial outlet
46 Sleeve
48 Housing protrusion
50 O-ring
52 Chamber
54 Lip ring seal
56 Inner leg
58 Radial groove
59 Outer leg
60 Support surface
62 Through-going bores
64 Wall
66 Second annular protrusion
68 Axial groove
69 Inlet branch
70 Protective particle screen
71 Inflow gap
72 Approach flow area
74 Radial outer edge

What is claimed is:

1. A coolant valve for a motor vehicle, the coolant valve comprising:
a housing comprising an axial inlet and a radial outlet;
a valve seat which surrounds a flow cross-section formed between the axial inlet and the radial outlet; and
a control body which is configured to be placed on the valve seat and to be lifted off the valve seat via an actuator, the control body comprising,
through-going bores via which the axial inlet is continuously connected to a chamber on a side of the control body which faces away from the axial inlet,
a first annular protrusion which axially extends towards the valve seat and via which the control body is configured to be placed on the valve seat,
a wall which extends radially between the first annular protrusion and the through-going bores, and
an axial groove which extends in a circumferential direction and which is delimited radially to an outside by the first annular protrusion and radially to an inside by the wall wherein,
the wall is formed by a second annular protrusion which is arranged radially inside the first annular protrusion so that the axial groove is annularly formed between the first annular protrusion and the second annular protrusion,
the second annular protrusion has an inner diameter,
the axial inlet is formed by an axial inlet branch having an inner diameter,
the inner diameter of the axial inlet branch is larger than or equal to the inner diameter of the second annular protrusion, and
the axial inlet branch is arranged concentrically to the second annular protrusion.

2. The coolant valve as recited in claim 1, wherein the wall delimiting the axial groove further extends axially.

3. The coolant valve as recited in claim 1, wherein the second annular protrusion is arranged concentrically to the first annular protrusion.

4. The coolant valve as recited in claim 1, wherein, in a closed state of the coolant valve in which the control body rests upon the valve seat via the first annular protrusion, the wall delimiting the axial groove radially to the inside has an axial distance to the valve seat.

5. The coolant valve as recited in claim 1, wherein,
the first annular protrusion has an axial extension,
the wall delimiting the axial groove radially to the inside has an axial extension, and
the axial extension of the wall is smaller than the axial extension of the first annular protrusion.

6. The coolant valve as recited in claim 1, wherein,
the control body further comprise a protective particle screen which is arranged on a side of the control body which faces the axial inlet,
the protective particle screen comprises a projection area which at least partially covers, in an axial direction relative to the control body, ends of the through-going bores in the control body facing the protective particle screen, and
the wall delimiting the axial groove radially to the inside has a diameter which is larger than a diameter of the protective particle screen.

7. The coolant valve as recited in claim 6, wherein,
the projection area of the protective particle screen covers, in the axial direction relative to the ends of the through-going bores in the control body facing the protective particle screen, at least 90% of the ends of the through-going bores, and
an inflow gap is radially formed as a fluidic connection of the axial inlet to the through-going bores between the protective particle screen and the wall delimiting the axial groove radially to the inside.

8. The coolant valve as recited in claim 6, wherein the protective particle screen comprises an approach flow area which is radially symmetric and which continuously decreases in an axial expansion from a center radially to an outside.

9. The coolant valve as recited in claim 8, wherein the approach flow area of the protective particle screen concavely extends from the center radially to the outside.

10. The coolant valve as recited in claim 8, wherein, in an open state of the coolant valve in which the control body is lifted off the valve seat, a tangent extends at a radial outer edge of the approach flow area of the protective particle screen between the valve seat and the first annular protrusion.

11. The coolant valve as recited in claim 1, wherein,
the actuator is an electromagnetic actuator which comprises an armature which, together with the control body, constitutes a movement unit, and
the movement unit, in a closed state of the coolant valve, comprises a same area which is pressure-effective in an axial direction on the side facing the axial inlet as on a side of the movement unit facing away from the axial inlet.

* * * * *